(12) United States Patent
Takushima (10) Patent No.: US 9,282,159 B2
(45) Date of Patent: *Mar. 8, 2016

(54) SYSTEM AND METHOD FOR PROVIDING A PROXY WITH A BROWSER CACHE AND A NATIVE CACHE

(71) Applicant: DeNA Co., Ltd., Tokyo (JP)

(72) Inventor: Nobutaka Takushima, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 217 days.

This patent is subject to a terminal disclaimer.

(21) Appl. No.: 14/084,464

(22) Filed: Nov. 19, 2013

(65) Prior Publication Data

US 2015/0026305 A1    Jan. 22, 2015

(30) Foreign Application Priority Data

Jul. 19, 2013    (JP) .................................. 2013-150483

(51) Int. Cl.
*H04L 29/08* (2006.01)
*G06F 17/30* (2006.01)

(52) U.S. Cl.
CPC ...... *H04L 67/2842* (2013.01); *G06F 17/30902* (2013.01); *H04L 67/02* (2013.01); *H04L 67/28* (2013.01)

(58) Field of Classification Search
CPC ....................... G06F 17/30902; H04L 67/2842
See application file for complete search history.

(56) References Cited

U.S. PATENT DOCUMENTS

| | | | | |
|---|---|---|---|---|
| 6,029,175 A | * | 2/2000 | Chow | G06F 17/30899 |
| 8,903,948 B2 | * | 12/2014 | Takushima | A63F 13/12 |
| | | | | 709/217 |
| 2002/0174189 A1 | * | 11/2002 | Peng | H04L 29/06 |
| | | | | 709/217 |
| 2007/0033155 A1 | * | 2/2007 | Landsman | G06F 17/30899 |
| 2007/0220000 A1 | * | 9/2007 | Walsh | G06F 12/0875 |
| 2012/0233199 A1 | * | 9/2012 | Jenkins | H04L 29/08729 |
| | | | | 707/769 |

FOREIGN PATENT DOCUMENTS

| | | |
|---|---|---|
| JP | H11-073361 A | 3/1999 |
| JP | 2005-063032 A | 3/2005 |

OTHER PUBLICATIONS

Japanese Patent Application No. 2013-150483: Office Action mailed on Nov. 11, 2014.
Optimize caching—Make the Web Faster,Google Developers, accessed on Jan. 10, 2014, https://developers.google.com/speed/docs/best-practices/caching; on website, indicated as last updated on Mar. 28, 2012.

* cited by examiner

*Primary Examiner* — Shirley Zhang
(74) *Attorney, Agent, or Firm* — Procopio, Cory, Hargreaves & Savitch LLP (57) ABSTRACT

An information terminal configured to execute an application, functions as a proxy that accesses a server through a network and performs communication by executing a native part execution unit, and functions as a browser that acquires download information from the server through the proxy and outputs the download information by executing a web browser.

5 Claims, 6 Drawing Sheets

SYSTEM AND METHOD FOR PROVIDING A PROXY WITH A BROWSER CACHE AND A NATIVE CACHE

BACKGROUND OF THE INVENTION

1. Field of the Invention

The present invention relates to an information terminal device that acquires information from a server and a non-transitory computer-readable storage medium storing data processing program that realizes processing thereof.

2. Description of Related Art

In recent years, in a mobile terminal such as a smart phone, processing using an application realized by a combination of a native part execution unit executed by a processing unit in the terminal, and a web browser that receives and uses information processed in a server side (web part execution unit) connected through a network is used.

With the use of such an application, advantages of both of the native part execution part and the web part execution part can be obtained, in such a way that a function uniquely incorporated in the mobile terminal is fully used by the native part execution unit while frequently updated processing is performed by the web part execution unit, and the like.

Figure 6:
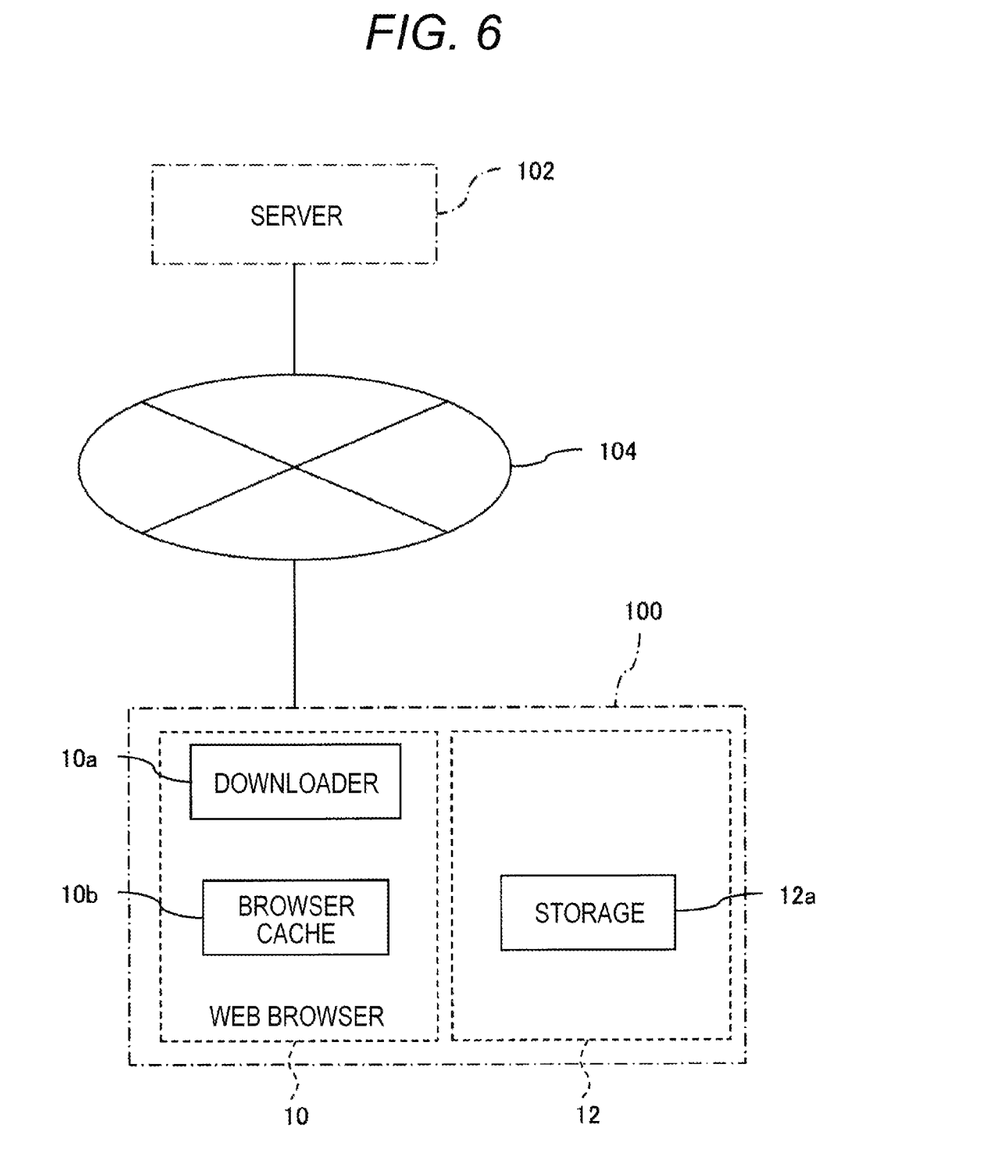
FIG. 6 is a diagram illustrating a function block of a conventional data processing system.

FIG. 6 is a diagram describing exchange of information between a mobile terminal 100 and a server 102 using an application realized by a native part execution unit and a web part execution part. The mobile terminal 100 accesses the server 102 connected through the network 104 using a downloader 10a included in a web browser 10 realized by execution of the application. The downloader 10a receives, for example, information encoded by Base64 or the like from the server 102. The information received from the server 102 is stored and held either in a browser cache 10b accessible from the web browser 10 of the mobile terminal 100 or a storage 12a at a native 12 side. At this time, processing of storing information in the storage 12a upon receiving the information from the web browser 10, and transferring the information held in the storage 12a to the web browser 10 upon receiving a request of the information from the web browser 10 is performed by execution of the native part execution unit. Information encoded by Base64 or the like is transferred between the web browser 10 and the storage 12a, and the information is stored in the storage 12a in an encoded state.

Further, processing of storing, in the browser cache 10b, data once acquired from the server 102, using a cache function of the web browser 10, and saving labor of acquiring the data stored in the browser cache 10b again is known.

https://developers.google.com/speed/docs/best-practices/caching discloses a technology of managing a hash value in which the last updated of data stored in a browser cache and version information are associated with each other, and, when data to be acquired is stored in the cache, using the data stored in the cache without acquiring the data through a communication network.

For example, the technology is used in a game that uses an information terminal device connected to a server through a network to reduce a communication load between the server and the information terminal device when frequently updated character data is transmitted from the server to the information terminal device.

SUMMARY OF THE INVENTION

By the way, when the capacity of a communication band of the network is small, a timeout may be caused when asset data having a large volume, such as image data, True Type font (ttf), or the like, is transmitted/received through the network. In addition, even if the browser cache and the native-side storage are used as described above, the communication band may not be sufficient.

In such a situation, a technology that enables efficient communication of information between the information terminal device and the server is expected.

One aspect of the present invention is an information terminal device configured to perform an application realized by a combination of a native part execution unit executed by a built-in processing unit, and a web browser configured to perform display processing of information received from a server connected through a network, and the information terminal device configured to function as a proxy configured to access the server through the network to perform communication by executing the native part execution unit, and to function as a browser configured to acquire download information from the server through the proxy and to output the download information by executing the web browser.

Here, it is favorable to include a terminal storage unit configured to store the download information received from the server through the proxy.

Further, it is favorable the download information includes asset data, identification information of the asset data, and version information of the asset data, and the proxy receives, when having received a request of asset data from the web browser, identification information of asset data to be received and version information of the asset data from the server before receiving the asset data from the server, determines whether the received version information is stored in the terminal storage unit, requests, to the server, transmission of the asset data corresponding to the version information when the received version information is not stored in the terminal storage unit, and does not request, to the server, transmission of the asset data corresponding to the version information when the received version information is stored in the terminal storage unit.

Further, it is favorable that the terminal storage unit stores the download information as binary information.

Further, it is favorable that the browser acquires the download information from the proxy in accordance with http.

The above-described information terminal device can be realized by the following non-transitory computer-readable storage medium storing data processing program. That is, a non-transitory computer-readable storage medium storing data processing program including an application realized by a combination of a native part execution unit executed by a processing unit in a computer terminal, and a web browser configured to perform display processing of information received from a server connected with the computer terminal through a network, for causing the computer terminal to function as a proxy configured to access the server through the network to perform communication by executing the native part execution unit, and to function as a browser configured to acquire download information from the server through the proxy and to output the download information by executing the web browser.

Here, it is favorable that the download information includes asset data, identification information of the asset data, and version information of the asset data, and the proxy receives, when having received a request of asset data from the web browser, identification information of asset data to be received and version information of the asset data from the server before receiving the asset data from the server, determines whether the received version information is stored in a terminal storage unit, requests, to the server, transmission of the asset data corresponding to the version information when the received version information is not stored in the terminal storage unit, and does not request, to the server, transmission of the asset data corresponding to the version information when the received version information is stored in the terminal storage unit.

According to the present invention, incorporating a proxy function to an application enables reduction in traffic between a server and an information terminal device, and efficient communication of information.

DETAILED DESCRIPTION OF THE INVENTION

Hereinafter, an embodiment of the present invention will be described based on the drawings.
<Overall Configuration of System>

Figure 1:
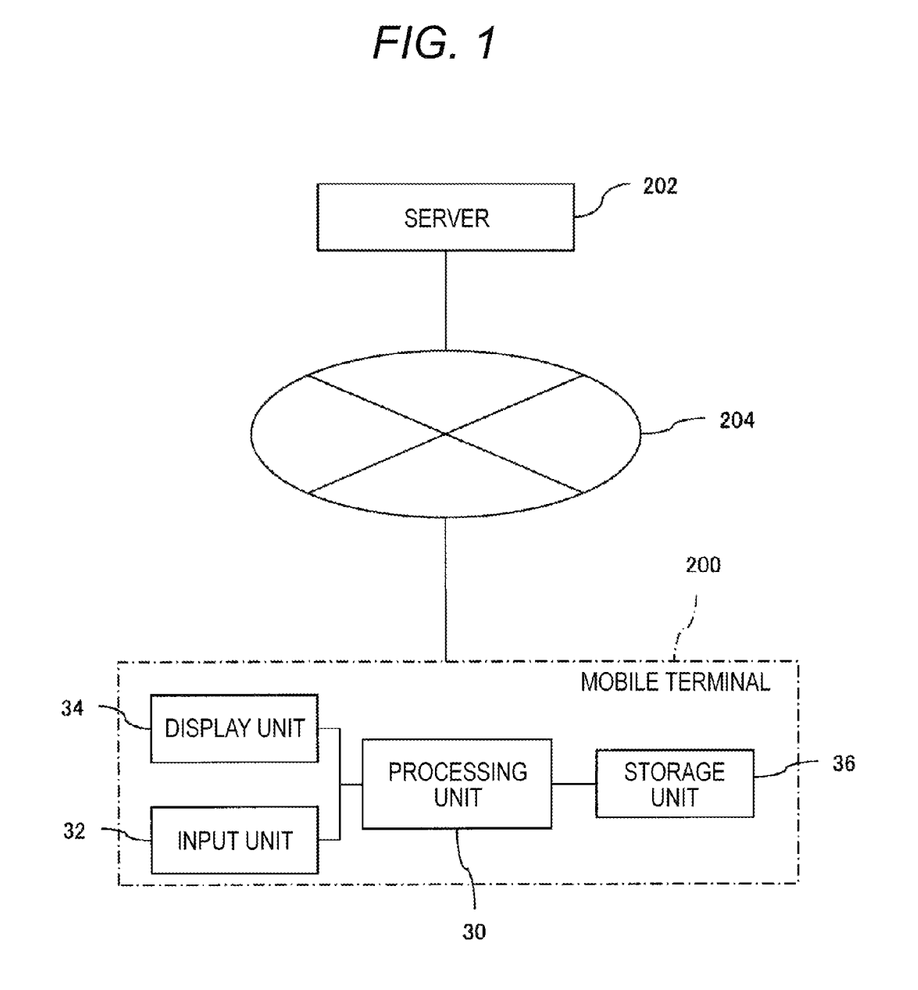
FIG. 1 is a diagram illustrating a configuration of a data processing system in an embodiment of the present invention.

FIG. 1 is a block diagram illustrating a schematic configuration of a data processing system according to the present embodiment. A server 202 is connected to a network 204, and an information terminal device 200 is connected to the network 204. The information terminal device 200 obtains necessary data from the server 202 through the network 204, and executes processing of a game and the like.

Note that, in the present embodiment, an example will be described, in which a game is executed in the information terminal device 200. However, a scope of application of the present invention is not limited to the example, any aspect falls within the scope of application as long as the aspect performs communication of frequently updated data between the server 202 and the information terminal device 200.
<Configuration and Function of Server>

The server 202 is a computer and includes various data processing functions, a communication function, and a storage function. A game logic, user data used when a game is executed, and asset data are stored in the server 202.

The asset data include, for example, image data, a moving image (animation data), text information (True Type font: ttf), and the like. While the asset data is not limited to these data, effects of the present invention become more prominent in a case where the data has a larger volume than document data and the like.

Typically, in a social game, the game logic for executing the game is basically not so frequently changed, but the asset data such as the image data and the moving image (animation data) are frequently changed. That is, the asset data is frequently changed by a developer and the like, and existing asset data in a memory 20 is frequently rewritten and updated by new asset data. To reflect the asset data subject to the change on the game executed in the information terminal device 200, it is necessary to transmit the asset data from the server 202 to the information terminal device 200.

Note that a computer of the developer may be connected to the server 202 through the network 204, or may be connected to the server 202 through another communication line such as an internal LAN, wireless communication, or the like.

Figure 2:
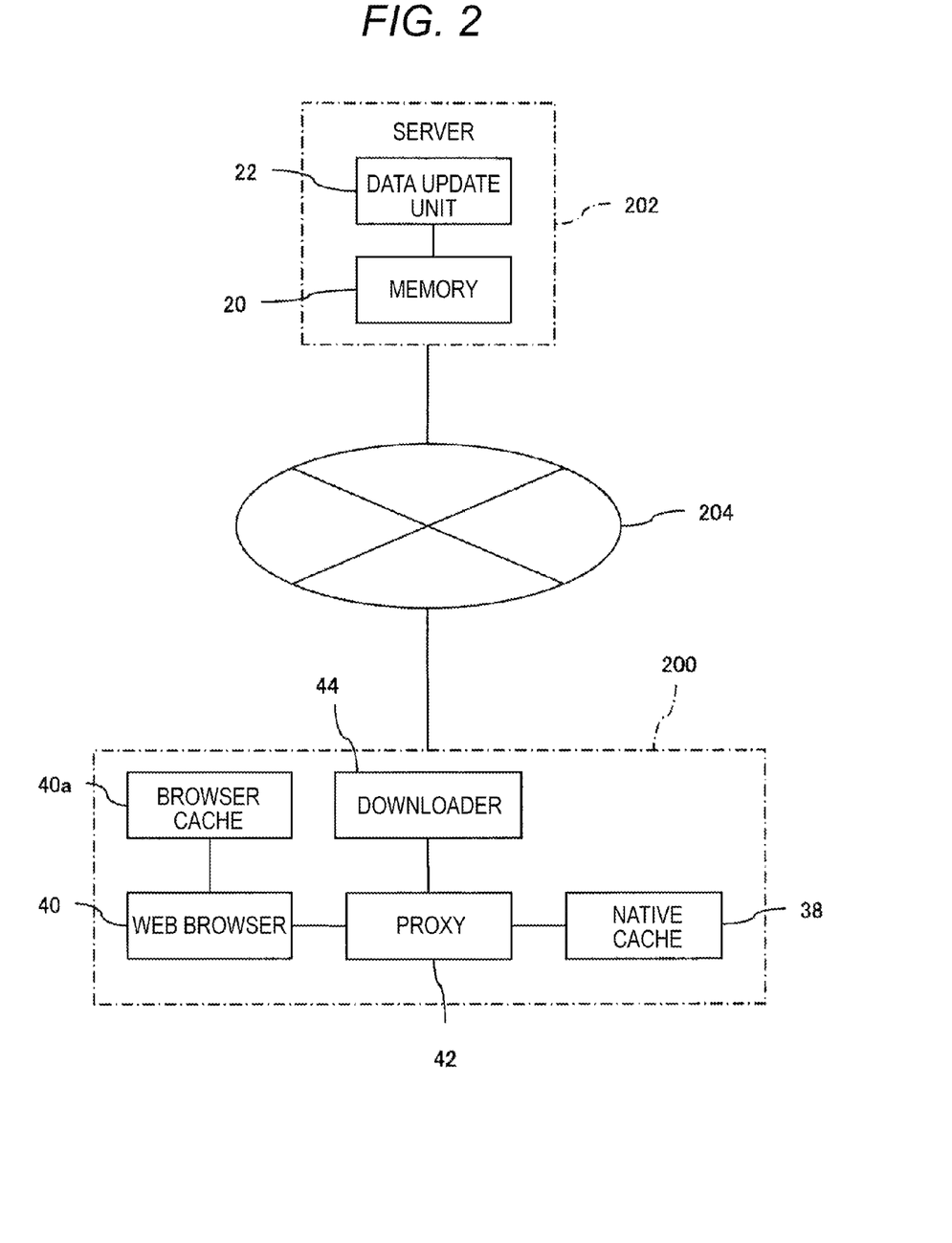
FIG. 2 is a diagram illustrating a function block of the data processing system in the embodiment of the present invention.

The server 202 includes, as illustrated in the function block diagram of FIG. 2, a data update unit 22, and the data update unit 22 manages update of data in the memory 20. That is, when having received update data, the data update unit 22 updates the data in the memory 20. Here, the data update is basically on the assumption of update of the asset data. Here, each piece of asset data is stored as one file where one image, one moving image, or the like is one unit, and each file is provided with attribute information such as an updated time and a file capacity in addition to a file name. That is, the existing asset data and new asset data can be associated with each other based on the attribute information. For example, when the asset data stored in the memory 20 is updated, the old asset data is updated by the new asset data, and the new asset data is provided with the same file name as the old asset data, so that the association is performed.

When transmitting data, the server 202 calculates a hash value about the transmission data for each file, and transmits the hash value that is a calculation result together with the file.

The data update unit 22 calculates the hash value from the data of the file itself or the attribute information, and transmits the hash value in association with the file. While the hash value may be calculated from the asset data (the image data, the moving image data, and the like) included in the file or the attribute information related thereto, the hash data is favorably calculated from the asset data itself. That is, when the asset data is updated, the hash value calculated from the asset data itself becomes a different value from the asset data calculated from the asset data itself before the update, and the hash value serves as version information indicating a version of the asset data itself. By comparing the hash values, whether the asset data has been updated can be reliably obtained.

Here, it is also favorable to calculate the hash value of the file every time the file is updated and to store the hash value and the file in the memory 20 in association with each other. In doing so, when a transmission request of the file is caused, the already stored hash value can be transmitted. Further, the hash value of the file in the memory 20 may be calculated and updated at fixed intervals, and further, the recalculated hash value when the file is transmitted may be updated in association with the file.

Note that, in the present embodiment, an example in which the processing is performed using one file as unit data will be described. However, a hash value may be calculated and processed for each unit data that includes a plurality of files.

Further, while, in the present embodiment, a hash value has been applied as version information, version information that is changed according to changed asset data (file) may be applied. For example, as the version information, a checksum, a check digit, a finger print, or the like may be applied.

The creator of the asset data connects the own computer to the server 202, and frequently rewrites data in the memory 20, for example. When having requested provision of data from the information terminal device 200, the data update unit 22 calculates a hash value based on unit data including a file to be transmitted, and transmits the hash value to the information terminal device 200.

For example, an API like below is prepared in the data update unit 22.

_get_bundle?paths=a, b, c, d - - - >{a: {hash: md5, body: base64} ... }

When the API is called by an access from the information terminal device 200, the data update unit 22 calculates a hash value md5 and causes the hash value to be the version information of a file a. By doing so, when the file a has been replaced, and the file is transmitted to the user afterwards, a hash value md5 corresponding to the transmission data is transmitted to the information terminal device 200 and is stored in the information terminal device 200.

<Configuration and Function of Information Terminal Device>

The information terminal device 200 is a terminal device including a computer such as a mobile phone, a smart phone, or a tablet. In the information terminal device 200, a processing unit 30 including a CPU performs basic data processing, as illustrated in FIG. 1. Further, the information terminal device 200 is provided with an input unit 32 and a display unit 34, and performs necessary data input and various types of display. For example, the display unit 34 is a liquid crystal panel r an organic EL panel, and the input unit 32 can be a touch panel provided with the display unit 34. Further, the information terminal device 200 is provided with a storage unit 36. The storage unit 36 includes a semiconductor memory, a flash memory, or the like, and stores and holds information (including the asset data) processed by the information terminal device 200. The storage unit 36 is used as a browser cache or a native cache described below.

The information terminal device 200 executes an application, accesses the server 202 through the network 204, and performs information processing. For example, when the user of the information terminal device 200 starts a game, the information terminal device 200 identifies an URL, accesses the server 202 that is a provider of a game program, and downloads an application that stores the game program from the server 202. In the present embodiment, processing of the game is performed by the application.

Here, the application is caused to function by a combination of a native part execution unit executed by the processing unit 30 accommodated in the information terminal device 200 and performing information processing in the information terminal device 200, and a web browser that processes information received from the server 202 through the network 204. For example, the application incorporates WebView that is a simple browser in the native part execution unit, and performs a part of image display in the information terminal device 200 using the function of the web browser.

A game program that is the application is stored in a native cache (native storage) 38 of the storage unit 36, and is executed by the processing unit 30, so that functions of the web browser 40, the proxy 42, and the downloader 44 are realized. The information terminal device 200 communicates with the server 202 by these functions, acquires the asset data such as a necessary image and a moving image, and advances the game while displaying the images in the display unit 34.

The proxy 42 and the downloader 44 are realized by execution of the native part execution unit in the application. This enables the proxy 42 and the downloader 44 to use functions uniquely provided in the information terminal device 200. For example, the proxy 42 and the downloader 44 can use a function of a network interface and the like unique to the information terminal device 200, and can perform processing using information available only by the native part execution unit such as a terminal information of the information terminal device 200, for example.

The web browser 40 realizes various functions such as to display the information obtained from the server 202 through the network 204 in the display unit 34, and the like. Further, the web browser 40 is provided with a browser cache (browser storage unit) 40a. The browser cache 40a is used as storage of information used when the web browser 40 executes various types of processing. It is favorable to store not frequently updated information in the browser cache 40a.

The information terminal device 200 accesses the server 202 through the proxy 42 when receiving information from the server 202. That is, both of cases in which information necessary for execution of the native part execution unit is acquired from the server 202, and in which information necessary for processing in the web browser 40 is acquired from the server 202 are performed through the proxy 42 realized by the native part execution unit included in the application.

To reduce a load of the display processing in the information terminal device 200, the web browser 40 can store, in the browser cache 40a, a part or the whole of files stored in the native cache 38. The web browser 40 checks whether the information necessary for the browser cache 40a is stored, and reads out the information and perform processing of display and the like, if stored. If the information is not stored in the browser cache 40a, the web browser 40 requests the information to the proxy 42. The proxy 42 confirms whether the requested information in the native cache 38 before requesting the information to the server 202, and reads out and transfers the information to the web browser 40, if stored. If the information is not stored in the native cache 38, the proxy 42 requests the information to the server 202 by the downloader 44.

Here, as described above, the server 202 stores the file including the asset data and the hash value calculated with respect to the file in association with each other, and when having received a request of the asset data from the information terminal device 200, the server 202 adds the associated hash value to the file as meta-data when transmitting the file including the requested asset data.

The processing unit 30 of the information terminal device 200 stores the received file (asset data) and hash value in the native cache 38 in association with a file name as a data table or the like. The asset data may not be encoded by Base64 or the like, and can be treated as binary data.

<Data Acquisition Procedure>

Hereinafter, processing by the information terminal device 200 for acquiring the asset data from the server 202 through the network 204 will be described with reference to the flowchart of FIG. 3. In the present embodiment, description will be given on the assumption that the web browser 40 accesses the server 202 for each page to be displayed in the game, and acquires the asset data for displaying the page.

Figure 4:
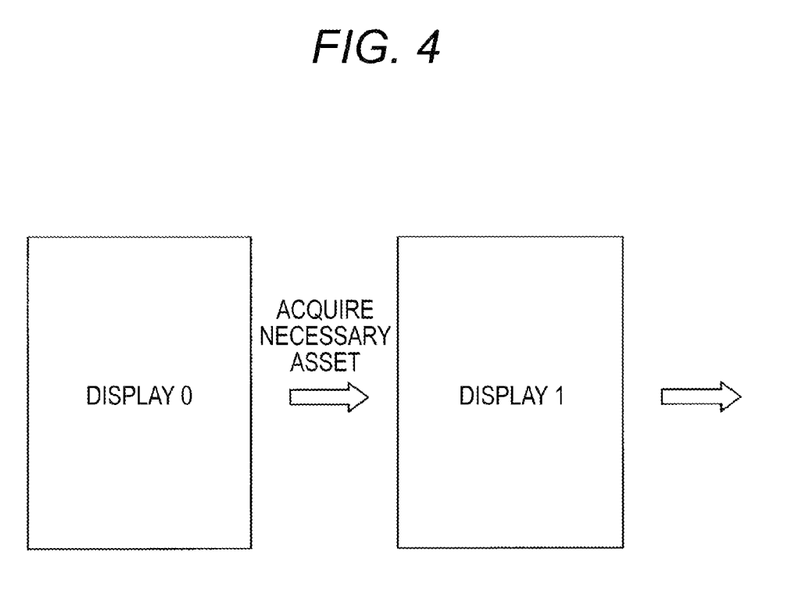
FIG. 4 is a diagram describing switching of a page.

When an application of the game is executed in the information terminal device 200, the information terminal device 200 and the server 202 are connected through the network 204 so as to be capable of mutually transmitting/receiving information. Here, as illustrated in FIG. 4, when a state where one page is being displayed is switched to a display of a next page in the information terminal device 200, new information is necessary in the web browser 40.

First, the web browser 40 confirms whether the asset data necessary for screen display and the like is stored in the browser cache 40a. The asset data that is not updated and the like are stored in the browser cache 40a, and the necessary asset data is read out and used if being stored in the browser cache 40a.

If the necessary asset data is not stored in the browser cache 40a, the web browser 40 requests the asset data to the proxy 42. Transmission/reception of information between the information web browser 40 and the proxy 42 is performed in accordance with hypertext transfer protocol (http).

The proxy 42 further requests the requested asset data to the server 202 using the downloader 44 realized by the native part execution unit.

The server 202 transmits file names of the files (file1, file2, ...) that includes the requested asset data and corresponding hash values (version information) to the information terminal device 200 in association with each other. For example, when the file name "file1" and a hash value hash1 associated therewith and the file name "file2" and a hash value hash2 associated therewith are included, data like (<html> file1 hash, file2 hash, ...) is transmitted.

At that time, it is favorable to calculate the hash value of the file at the time of transmission, and to make a pair of the file name and the calculated hash value and transmit the pair. This enables the hash value calculated based on the latest asset value at the time of transmission to be reliably transmitted. Meanwhile, when a time lag is allowed to some extent, the hash value is calculated in advance, the file and the hash value are stored in the memory 20 in association with each other, and the file name and the corresponding hash value may be read out and transmitted at the time of transmission. In this case, it is not necessary to calculate the hash value in the server 202 at every transmission, and a load of arithmetic processing of the server 202 can be reduced.

As described above, before the transmission of the file of the asset data necessary for displaying a next page, the asset data that is the main body (content) of the file is not transmitted, and the file name that is identification information unique to the file and the hash value that is the version information are transmitted. The proxy 42 acquires the file name and the hash value.

The proxy 42 determines whether the same hash value as the received hash value is stored in the native cache 38. When the same hash value is stored in a determination result, it can be determined that, about a file having the file name associated with the hash value, the latest asset data is already stored in the native cache 38. In this case, it is not necessary to acquire the asset data of the file from the server 202 again. Therefore, the proxy 42 reads out the asset data of the file from the native cache 38 without acquiring the file from the server 202, and transfers the read out asset data to the web browser 40. The web browser 40 performs processing such as image display using the received asset data.

Note that, when the identity of the hash value is determined, the identity of the file name may be determined at the same time. That is, the proxy 42 may determine whether the same set of a file name and a hash value as the set of the received file name and hash value is stored in the native cache 38. Accordingly, with respect to the asset data of the same file identified by the file name, the identity of the data can be confirmed using the hash value. Therefore, whether data is the latest asset data can be more reliably determined.

Figure 3:
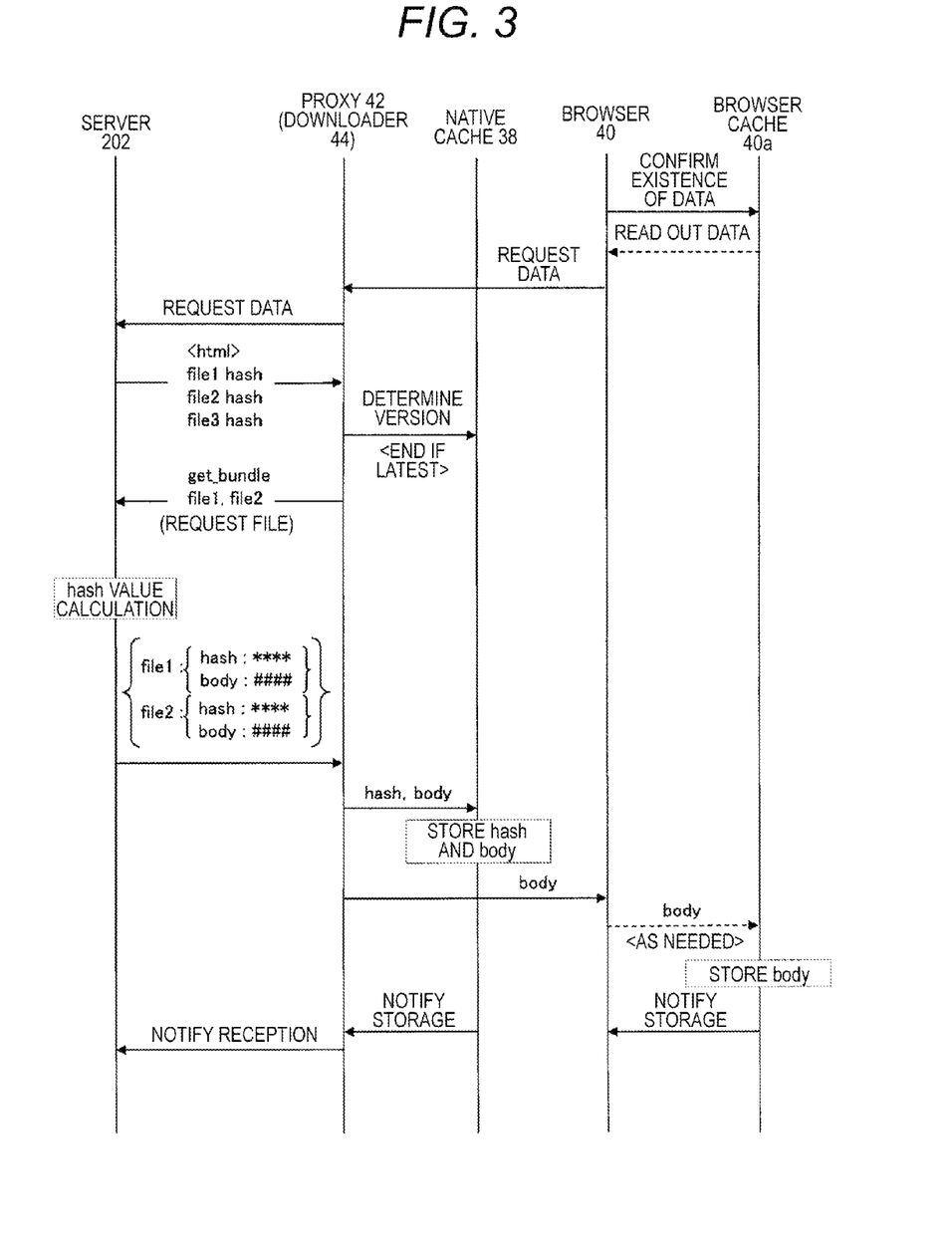
FIG. 3 is a flowchart describing transmission/reception of data in the embodiment of the present invention.

The example of FIG. 3 illustrates a file having the same hash value is already registered with respect to the file file3, while there are no files having the same hash values with respect to the files file1 and file2. In this case, the proxy 42 transmits a request of acquiring only the two files file1 and file2 to the server 202 using the downloader 44. In this example, the proxy 42 transmits a request like "_get bundle file1, file2" to the server 202 using AJAX (Asynchronous JavaScript+XML).

In response to the request, the server 202 reads out appropriate files file1 and file2 from the memory 20, and transmits these files to the information terminal device 200. At this time, the server 202 calculates a hash value with respect to the read file, and provides the proxy 42 of the information terminal device 200 with a set of the file and corresponding hash value. That is, the server 202 transmits the respective hash values hash and asset data bodies that is main bodies of the files (content) to the proxy 42 with respect to the files file1 and file2. At this time, the asset data bodies may be encoded in accordance with Base64 or the like, or may be treated as not-encoded binary.

Here, it is favorable that the data update unit 22 of the server 202 calculates a hash value at the stage of transmission, and transmits the hash value obtained by the calculation. Accordingly, the hash value to be transmitted is the hash value with respect to the latest asset data at the point of time. Therefore, it is secured that the hash value stored in the information terminal device 200 corresponds to the asset data of the latest version.

Meanwhile, when a time lag is allowed to some extent, the hash value is calculated in advance, the hash value and the asset data are stored in the memory 20 in association with each other, and the file including the asset data and the corresponding hash value may be read out and transmitted at the time of transmission. In this case, it is not necessary to calculate the hash value in the server 202 at every transmission, and a load of arithmetic processing of the server 202 can be reduced.

The proxy 42 transfers at least a file main body from among the file name, the file main body, and the hash value, to the web browser 40. At this time, in the proxy 42, processing such as content conversion of the received asset data and the like may be performed. For example, processing of converting the received asset data into a data format supported by the web browser 40 may be performed. Since the proxy 42 is realized by a native part, the proxy 42 can easily obtain the capacity of the storage unit 36 of the information terminal device 200, a resolution of the screen of the display unit 34, the processing speed of the processing unit 30 of the information terminal device 200 and an available data format, and the like from the information terminal device 200, and has an advantage of applying processing according to each information terminal device 200 based on these pieces of information.

The web browser 40 performs processing such as image display using the received asset data. Further, the web browser 40 stores (caches) the received asset data in the browser cache 40a, as needed.

Further, the proxy 42 stores the file name, the file main body, and the hash value in the native cache 38. After performing such processing, the proxy 42 transmits a reception notification to the server 202 upon receiving completion of storage of the native cache 38.

As described above, every time the user performs a certain operation about the game using the information terminal device 200, the asset data to be used in the web browser 40 can be acquired from the server 202 using the proxy 42 (downloader 44) according to the application executed in the information terminal device 200.

At this time, the data of the file necessary for displaying a page is not transmitted as it is from the server 202, and the file name and the hash value are first transmitted. Then, whether the appropriate file (file main body) is stored in the native cache 38 is determined using the hash value, and if the file is stored, transmission of the file main body is not requested to the server 202. Therefore, the data amount to be communicated can be substantially reduced, and the efficiency of communication can be enhanced. Therefore, even if the communication capacity of the network 204 is not sufficient, only the necessary data can be communicated.

Further, the asset data itself that is the main body of the file is stored in the native cache 38 accessed by the proxy 42, so that the file can be cached without a concern about the data capacity, compared with a case of using only the browser cache 40a. Typically, the capacity of the browser cache 40a accessible from the web browser 40 is small, and is not suitable for caching of the asset data having a large volume, such as the image data and the True Type font (ttf). Meanwhile, the native cache 38 is accessible from the proxy 42 realized by the native application, and the capacity can be relatively freely set according to the capacity of the storage unit 36 of the information terminal device 200 and the like. Therefore, the native cache 38 is suitable for caching of the asset data having a large volume such as the image data and the True Type font (ttf).

Further, from the web browser 40's point-of-view, the web browser 40 can acquire the asset data by accessing the proxy 42, similarly to accessing the server 202 as in the conventional manner. In the proxy 42, an access from the native cache 38 is allowed, and a check of whether there is damage to data stored in the native cache 38 can be independently executed in the web browser 40 and other use is also available.

Further, since the native part execution unit that realizes the functions of the proxy 42 and the downloader 44 is incorporated in the application, the functions of the proxy 42 and the downloader 44 can be terminated at the timing when the processing by the application is completed. Accordingly, the processing of the proxy 42 and the downloader 44 can be terminated at the timing when the processing of a game and the like is terminated. Therefore, the resources of the information terminal device 200 are released and use by another application can be available, and consumption of a battery of the information terminal device 200 can be reduced.

Note that, in the present embodiment, an example of requesting the asset data for display of every page has been described. However, the embodiment is not limited to the example, and asset data necessary for displaying a plurality of pages may be acquired all at once.

Further, at the timing of accessing from the information terminal device 200, a means to determine whether the access is the first access for the game is employed, and in a first response, data to be transmitted is subject to JavaScript Object Notation (JSON) and the data and the hash value may be transferred at once.

Further, if there is a query during calculation of a hash value in the server 202, it is assumed that the server 202 may return an old hash value. For example, when a finger print not depending on a file system is used with respect to the version of a file,
(1) placing a new file in a preparation directory tree,
(2) calculating a hash value of an additional file, and
(3) placing the hash value in a release directory tree after calculation of the hash value is completed,
may be performed.

To cope with a case of inseparably updating a plurality of files, an operation like the above can also be performed.

Further, in the above processing, data stored in the browser cache 40a and data stored in the native cache 38 may be optimized.

<Modification>

Figure 5:
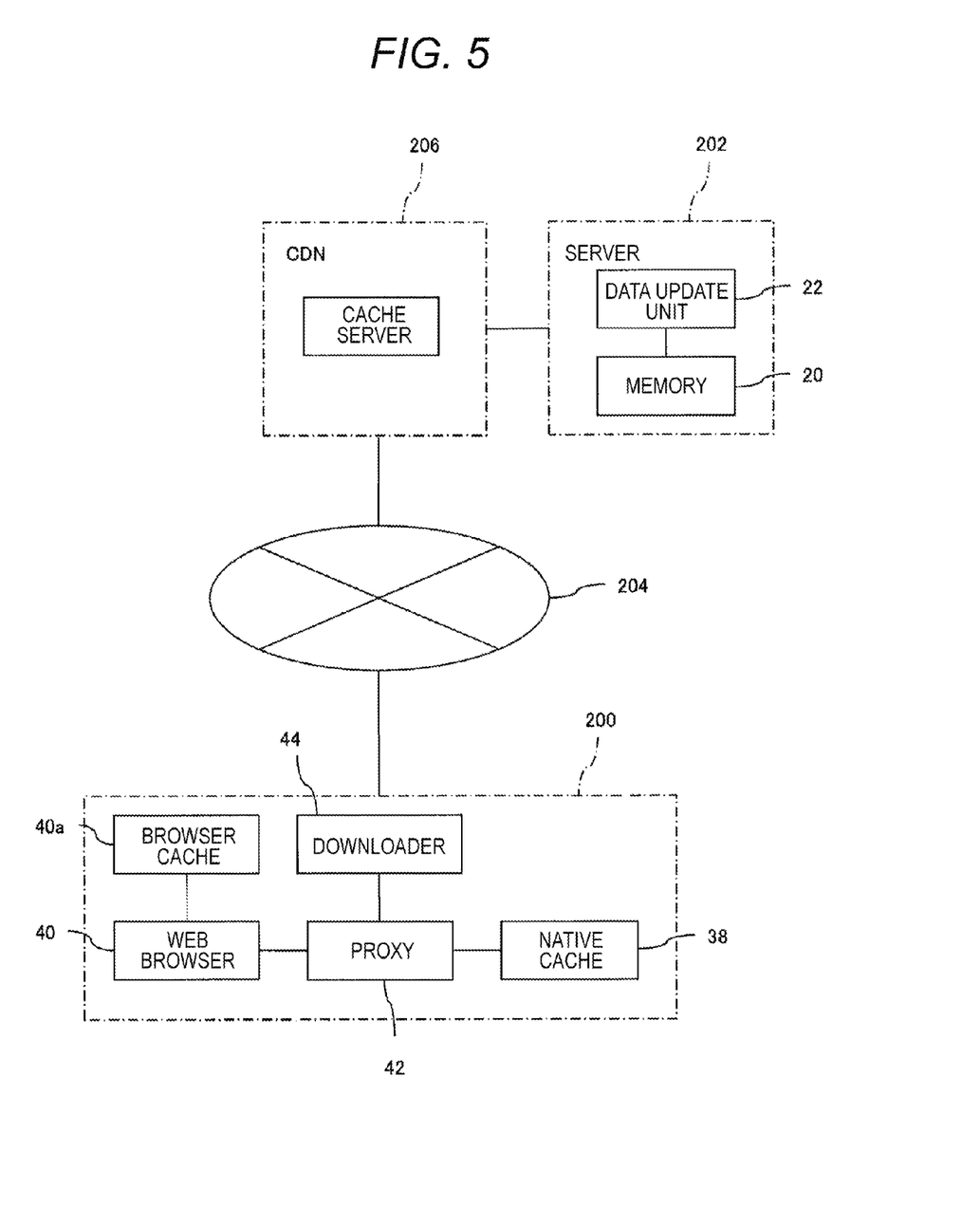
FIG. 5 is a diagram illustrating a function block of another example of the data processing system in the embodiment of the present invention.

While, in the above-described embodiment, the information terminal device 200 directly receives information from the server 202 through the network 204, the embodiment is not limited to this example. In the present modification, an information terminal device 200 receives the information from a server 202 through a content delivery network (CDN) 206. The CDN 206 is a network in which a site operator side that performs content distribution and the like efficiently and stably provides the end users with the content, and enables reduction of a load of the server 202 due to access concentration and the like.

The CDN 206 is configured to connect a plurality of servers (hereinafter, cache server) that is synchronized with the asset data of the server 202, and to distribute accesses from the information terminal device 200 to the cache servers. This enables distribution of the accesses to the server 202. When accessing a site configured from the CDN 206, the information terminal device 200 first accesses the server 202. However, exchange of data is not performed there, and the server 202 distributes the access to a cache server of the CDN 206 closest to the information terminal device 200. Subsequent accesses from the information terminal device 200 are set to be directed to the distributed cache server, and a response to a request of data becomes satisfactory and a load of the server 202 can be reduced.

<Effects of Embodiment>

Effects like below can be obtained in the present embodiment.

Since the asset data that is the main body of the file can be stored in the native cache 38, there are less problems with the small capacity of the browser cache 40a.

The browser cache 40a is used by the web browser 40. Control of the browser cache 40a by the processing unit 30 existing outside the web browser 40 is difficult. In the present embodiment, since the asset data stored in the native cache 38 can be used in the native part execution unit, it is not necessary to deal with the data stored in the browser cache 40a from the application, and such a problem is not caused. Since the data stored in the native cache 38 can be used from the web browser 40 through the proxy 42, efficient processing can be performed, and occurrence of wasteful communication between the web browser 40 and the server 202 can be prevented.

At the start of the application of a game and the like, only downloading of an app is required, and special processing such as downloading of a large volume of data and the like is not necessary. Therefore, the startup time can be reduced.

Even during an operation of the application, updating of the asset data is possible, and the latest data can be supplied at the timing required by the user.

The processing of the proxy 42 and the downloader 44 can be terminated at the timing when the processing by the application is terminated. The resources of the information terminal device 200 are released and use by other applications can be available, and the consumption of the battery of the information terminal device 200 can be reduced.

What is claimed is:

1. An information terminal device comprising:
a terminal storage unit configured to provide a browser cache and a native cache; and
a processing unit configured to perform an application realized by a combination of a native part execution unit executed by the processing unit, and
a web browser executed by the processing unit configured to perform display processing of information received from a server connected through a network, and
the information terminal device configured to function as a proxy configured to access the server through the network to perform communication by executing the native part execution unit, and to function as a browser configured to acquire download information from the server through the proxy and to output the download information by executing the web browser wherein the processor is configured to, on execution of the web browser;
for data needed for the execution of the web browser not being in the browser cache, execute the native part, execution unit to access the server as the proxy and obtain the download information and store the download information in the native cache, and execute the web browser to obtain the download information from the native cache for storage into the browser cache;

for data needed for the execution of the web browser being in the browser cache, utilize the data in the browser cache in the execution of the web browser;

wherein the download information includes asset data, identification information of the asset data, and version information of the asset data, and the proxy receives, when having received a request of asset data from the web browser, identification information of asset data to be received and version information of the asset data from the server before receiving the asset data from the server, determines whether the received version information is stored in the terminal storage unit, requests, to the server, transmission of the asset data corresponding to the version information when the received version information is not stored in the terminal storage unit, and does not request, to the server, transmission of the asset data corresponding to the version information when the received version information is stored in the terminal storage unit.

2. The information terminal device according to claim 1, wherein the terminal storage unit configured to store the download information received from the server through the proxy.

3. The information terminal device according to claim 2, wherein
the terminal storage unit stores the download information as binary information.

4. The information terminal device according to claim 1, wherein the browser acquires the download information from the proxy in accordance with http.

5. A non-transitory computer-readable storage medium storing data processing program having instructions for an application realized by a combination of a native part execution unit executed by a processing unit in a computer terminal, and a web browser configured to perform display processing of information received from a server connected with the computer terminal through a network, for causing the computer terminal to function as a proxy configured to access the server through the network to perform communication by executing the native part execution unit, and to function as a browser configured to acquire download information from the server through the proxy and to output the download information by executing the web browser, the instructions further comprising:

managing a browser cache and, a native cache: and on execution of the web browser:

for data needed for the execution of the web browser not being in the browser cache, executing the native part execution unit to access the server as the proxy and obtain the download, information and store the download information in the native cache, and executing the web browser to obtain the download information from the native cache for storage into the browser cache;

for data needed for the execution of the web browser being in the browser cache, utilizing the data in the browser cache in the execution of the web browser;

wherein
the download information includes asset data, identification information of the asset data, and version information of the asset data, and the proxy receives, when having received a request of asset data from the web browser, identification information of asset data to be received and version information of the asset data from the server before receiving the asset data from the server, determines whether the received version information is stored in a terminal storage unit, requests, to the server, transmission of the asset data corresponding to the version information when the received version information is not stored in the terminal storage unit, and does not request, to the server, transmission of the asset data corresponding to the version information when the received version information is stored in the terminal storage unit.

* * * * *